US010821355B2

(12) United States Patent
Miao

(10) Patent No.: US 10,821,355 B2
(45) Date of Patent: *Nov. 3, 2020

(54) INFORMATION PROCESSING METHOD AND APPARATUS, ELECTRONIC DEVICE, AND STORAGE MEDIUM

(71) Applicant: NETEASE (HANGZHOU) NETWORK CO., LTD, Zhejiang (CN)

(72) Inventor: Qingbo Miao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,842

(22) Filed: Aug. 3, 2018

(65) Prior Publication Data
US 2019/0099665 A1 Apr. 4, 2019

(30) Foreign Application Priority Data

Sep. 30, 2017 (CN) .......................... 2017 1 0938854

(51) Int. Cl.
G06F 3/048 (2013.01)
A63F 13/2145 (2014.01)
(Continued)

(52) U.S. Cl.
CPC .......... *A63F 13/2145* (2014.09); *A63F 13/23* (2014.09); *A63F 13/426* (2014.09);
(Continued)

(58) Field of Classification Search
CPC .......... A63F 13/23; A63F 13/24; A63F 13/25; G06F 3/016; G06F 3/011; G06F 3/0488; G06F 3/038; G06F 3/01
See application file for complete search history.

(56) References Cited

U.S. PATENT DOCUMENTS 6,227,973 B1 * 5/2001 Kikuchi .................. A63F 13/10
463/31
8,089,484 B2 * 1/2012 Tanabe .................... A63F 13/10
345/473
(Continued)

FOREIGN PATENT DOCUMENTS

CN 103019444 A 4/2013
CN 105094345 A 11/2015
(Continued)

OTHER PUBLICATIONS

Xiaofantang of King glory. King glory Han, Paopao hero teaching: Han Xin skills / even detailed explanation. Jun. 15, 2017(Jun. 15, 2017). p. 1 to p. 8.
(Continued)

*Primary Examiner* — Olga V Merkoulova
(74) *Attorney, Agent, or Firm* — Gang Yu

(57) ABSTRACT

An information processing method is provided. The method includes: a motion control including an area object and an operation object is provided on the GUI, and an initial position of the operation object is within a range of the area object; a first sliding touch operation is detected on the operation object, and the operation object is moved within a predetermined range according to a movement of a touch point of the first sliding touch operation; the position of the touch point is detected on the GUI, and under the condition of the position of the touch point satisfying a preset condition, an indication locking object provided on the GUI; the touch point is determined to move into a range of the indication locking object, and the operation object is controlled to enter a position-locked state; and, under the position-locked state, the virtual character is controlled to continuously move in the game scene at least according to a locking position of the operation object.

22 Claims, 5 Drawing Sheets

(51) Int. Cl.
    *G06F 3/0488* (2013.01)
    *A63F 13/23* (2014.01)
    *A63F 13/837* (2014.01)
    *A63F 13/426* (2014.01)
    *A63F 13/219* (2014.01)

(52) U.S. Cl.
    CPC ........ *A63F 13/837* (2014.09); *G06F 3/04886*
         (2013.01); *A63F 13/219* (2014.09); *G06F*
         *2203/04808* (2013.01)

(56) References Cited

U.S. PATENT DOCUMENTS

| | | | | |
|---|---|---|---|---|
| 8,821,279 | B2* | 9/2014 | Yoshikawa | A63F 13/35 |
| | | | | 463/31 |
| 9,058,725 | B2* | 6/2015 | Kitamura | G07F 17/3276 |
| 9,901,821 | B2* | 2/2018 | Matsui | A63F 13/533 |
| 2006/0252531 | A1* | 11/2006 | Kando | A63F 13/10 |
| | | | | 463/30 |
| 2010/0302138 | A1* | 12/2010 | Poot | G06F 3/011 |
| | | | | 345/156 |
| 2015/0212647 | A1* | 7/2015 | Kim | G02B 27/017 |
| | | | | 345/173 |
| 2015/0231509 | A1* | 8/2015 | McMain, II | A63F 13/55 |
| | | | | 463/31 |
| 2018/0001189 | A1* | 1/2018 | Tang | A63F 13/2145 |
| 2018/0028907 | A1* | 2/2018 | Weng | A63F 13/2145 |
| 2018/0367494 | A1* | 12/2018 | Skeene | H04L 51/32 |
| 2019/0099669 | A1* | 4/2019 | Miao | A63F 13/42 |

FOREIGN PATENT DOCUMENTS

| | | | | |
|---|---|---|---|---|
| CN | 107008003 | A | 8/2017 | |
| CN | 107019909 | A | 8/2017 | |
| CN | 107185231 | A | 9/2017 | |
| EP | 2610727 | A2 | 7/2013 | |
| WO | WO2017/054466 | * | 4/2017 | ............. G06F 3/048 |

OTHER PUBLICATIONS

Lin, Qian. How to choose the king glory operation button. Oct. 30, 2016 (Oct. 30, 2016). p. 1 to p. 2.
King Glory. King glory skills teaching. Dec. 11, 2015 (Dec. 11, 2015). p. 1 to p. 2.

\* cited by examiner

INFORMATION PROCESSING METHOD AND APPARATUS, ELECTRONIC DEVICE, AND STORAGE MEDIUM

CROSS-REFERENCE TO RELATED APPLICATIONS

The present disclosure claims priority of Chinese Patent Application No. 201710938854.8, filed to China Patent Office on Sep. 30, 2017. Contents of the present disclosure are hereby incorporated by reference in entirety of the Chinese Patent Application.

TECHNICAL FIELD

The present disclosure relates to the technical field of games, and in particular to an information processing method and apparatus, an electronic device, and a storage medium.

BACKGROUND

In many video games performed by mobile terminal, at least, movement direction of a visual character is controlled by a virtual joystick. A user may adjust position of the virtual joystick by pressing and controlling the virtual joystick. At this time, the movement direction of the character will also be changed along with a relative position of the virtual joystick. When a finger of the user releases the virtual joystick, the movement of the character will automatically be stop.

SUMMARY

At least one embodiment of the present disclosure provides an information processing method and apparatus, an electronic device, and a storage medium.

In one embodiment of the present disclosure, an information processing method is provided by executing a software application on a processor of a mobile terminal and rendering a graphical user interface (GUI) on a touch screen of the mobile terminal, and contents displayed by the GUI at least including a partially game scene and a partially virtual character. The method includes:

providing a motion control on the GUI, the motion control including an area object and an operation object, and an initial position of the operation object is within a range of the area object; detecting a first sliding touch operation on the operation object, and moving the operation object within a predetermined range according to a movement of a touch point of the first sliding touch operation; detecting the position of the touch point on the GUI, and under the condition of the position of the touch point satisfying a preset condition, providing an indication locking object on the GUI; determining the touch point moves into a range of the indication locking object, and controlling the operation object to enter a position-locked state; and controlling, under the position-locked state, the virtual character to continuously move in the game scene at least according to a locking position of the operation object.

In another embodiment of the present disclosure, an information processing apparatus is provided by executing a software application on a processor of a mobile terminal and rendering a GUI on a touch screen of the mobile terminal, and contents displayed by the GUI at least including a partially game scene and a partially virtual character. The apparatus includes:

a first providing component, configured to provide a motion control on the GUI, the motion control including an area object and an operation object of which an initial position is within a range of the area object; a first detection component, configured to detect a first sliding touch operation acting on the operation object, and move the operation object within a predetermined range according to a movement of a touch point of the first sliding touch operation; a second detection component, configured to detect a position of the touch point of the first sliding touch operation on the GUI, and provide, under the condition of the position of the touch point in the GUI satisfying a preset condition, an indication locking object on the GUI; a determination component, configured to determine the touch point moves into a range of the indication locking object, and control the operation object to enter a position-locked state; and a first control component, configured to control, under the position-locked state, the virtual character to continuously move in the game scene at least according to a locking position of the operation object.

In another embodiment of the present disclosure, an electronic device is provided. The electronic device includes: at least one processor; and at least one memory, configured to store at least one executable indication of the at least one processor, and the at least one processor is configured to execute the information processing method by executing the at least one executable indication.

In another embodiment of the present disclosure, a computer-readable storage medium is provided, on which at least one computer program is stored, and the at least one computer program is executed by at least one processor to implement the information processing method.

DETAILED DESCRIPTION

In order to make those skilled in the art better understand solutions of the present disclosure, the following describes solutions clearly and completely below in the present disclosure.

Compared with the related art, the related art has at least two problems as follows:

firstly, when control a visual character to move, a hand of a user needs to be keep pressing a joystick area, therefore, exploration into other kinds of gameplay is limited;

secondly, the above-mentioned mode is low in operation efficiency, and particularly, when a hand operating on a graphical user interface (GUI) is moved in a high speed or baffles in the game scene are dense, a visual character position cannot be effectively adjusted, therefore, user experience is poor.

In one embodiment of the present disclosure, an information processing method is provided. It should be noted that the steps shown in the flowchart may be performed in a computer system such as a set of computer-executable indications. Although a logical order is shown in the flowchart, in some cases, the illustrated or described steps may be performed in a different order from the order shown in the flowchart.

Figure 1:
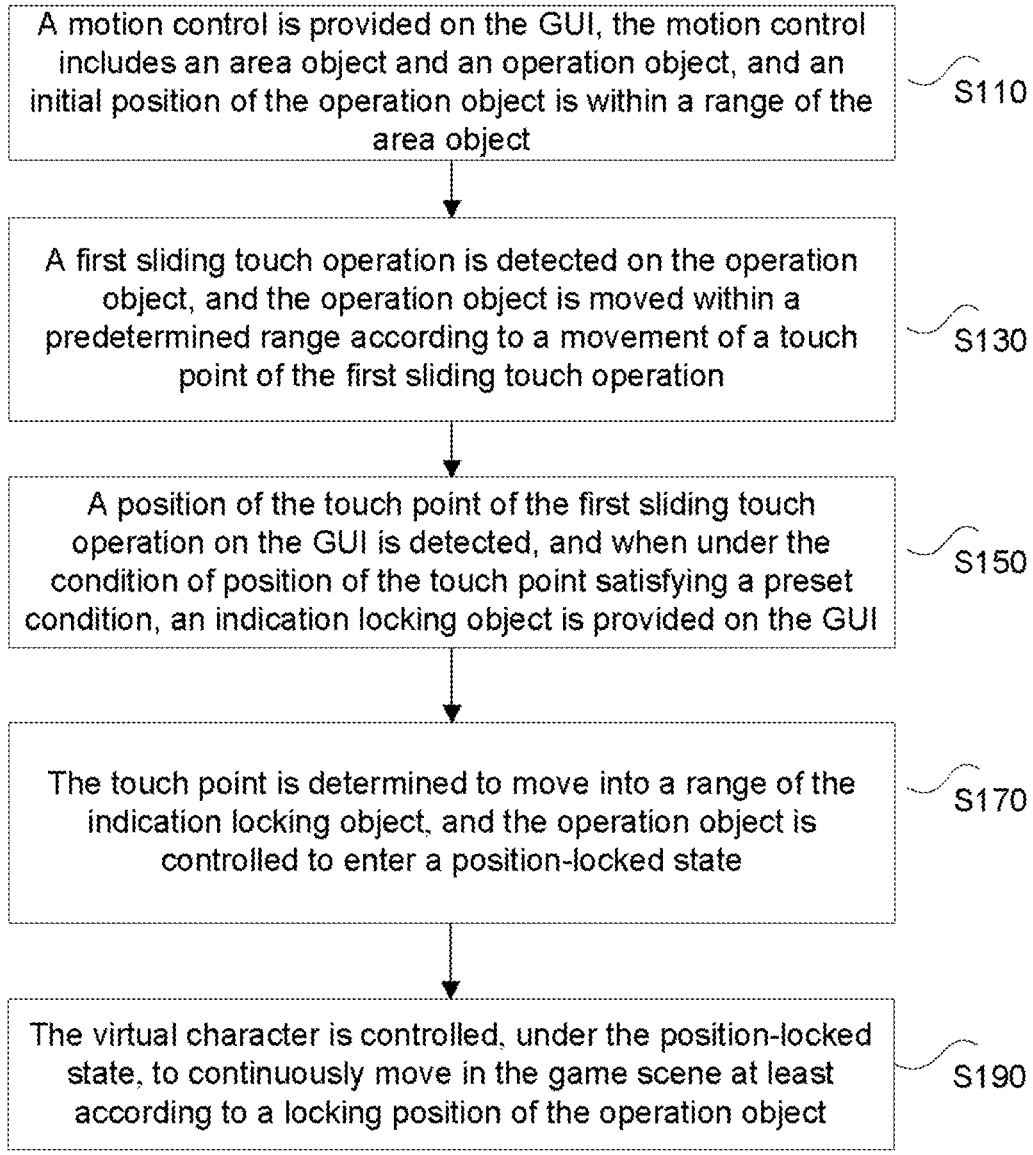
FIG. 1 is a flowchart of an information processing method according to an embodiment of the present disclosure.

FIG. 1 is a flowchart of an information processing method according to an embodiment of the present disclosure. This method is provided by executing a software application on a processor of a mobile terminal and rendering a GUI on a touch screen of the mobile terminal, and contents displayed by the GUI at least include a partially game scene and a partially virtual character. The method may include the steps as follows.

At step S110, a motion control is provided on the GUI, the motion control includes an area object and an operation object, and an initial position of the operation object is within a range of the area object.

At step S130, a first sliding touch operation is detected on the operation object, and the operation object is moved within a predetermined range according to a movement of a touch point of the first sliding touch operation.

At step S150, a position of the touch point of the first sliding touch operation on the GUI is detected, and when under the condition of position of the touch point satisfying a preset condition, an indication locking object is provided on the GUI.

At step S170, the touch point is determined to move into a range of the indication locking object, and the operation object is controlled to enter a position-locked state.

At step S190, the virtual character is controlled, under the position-locked state, to continuously move in the game scene at least according to a locking position of the operation object.

The information processing method in the present exemplary embodiment can achieve the technical effects in the following aspects.

In one aspect, the method provided does not require a user to operate the motion control all the time, therefore, the user can perform other operations during a movement of a character.

In another aspect, the method can be applied widely, be suitable for mobile terminals that support a touch operation, and reduces requirements for device hardware.

In another aspect, the operation during performing the method is more intuitive and convenient, and operation success rate and accuracy are greatly improved.

The method solves the technical problem that a movement control mode of a visual character in a mobile terminal game is low in efficiency, narrow in adaptability, not intuitive, and not convenient enough.

In the following, the steps of the information processing method in the present exemplary embodiment will be further described.

Figure 2:
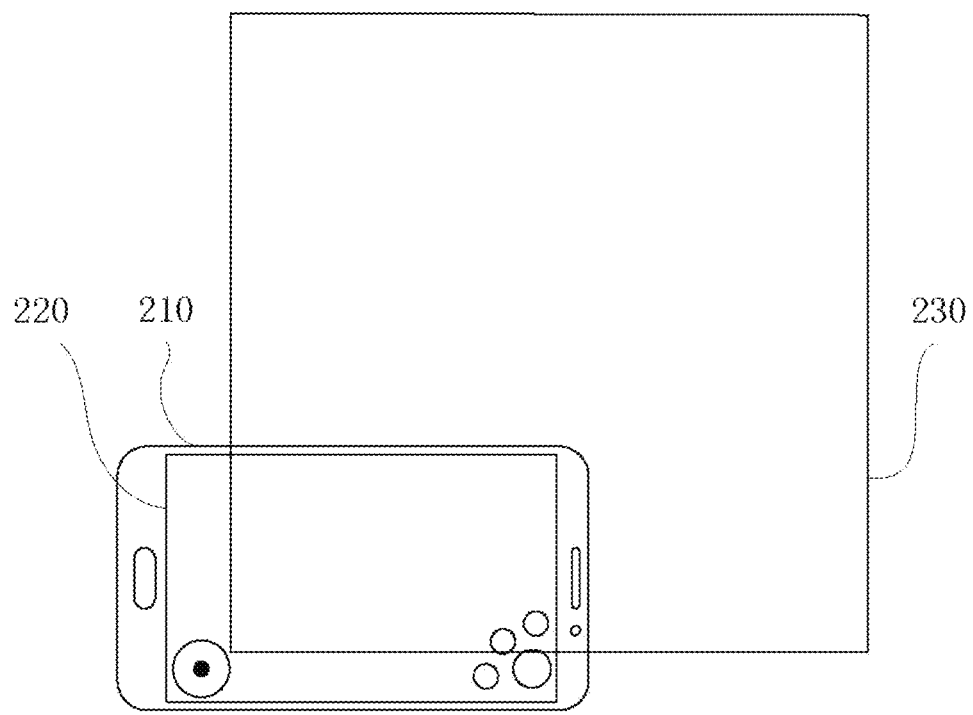
FIG. 2 is a schematic diagram of a game scene according to an embodiment of the present disclosure.

Contents on the GUI may include an entire part of the game scene, and may also include part of the game scene. For example, as shown in FIG. 2, since a game scene 230 is relatively large, local content of the game scene 230 is displayed on a GUI 220 of a mobile terminal 210 during running the game. The game scene may be a square shape as shown in FIG. 2 or other shapes (e.g., a circle, etc.). The game scene may include ground, mountains, rocks, flowers, grass, trees, buildings, and the like.

The content on the GUI may include an entire part of a virtual character or a part of an virtual character. For example, in a third person perspective game, the content on the GUI may include the entire part of the virtual character such as a virtual character 350 shown in FIG. 3. For another example, in a first person perspective game, the content on the GUI may include part of the virtual character.

In an optional embodiment, the GUI includes a mini-map. The mini-map may be a thumbnail of the entire game scene (e.g., 310 in FIG. 3), or may be a thumbnail of a local part of the game scene. Different details may be displayed in the mini-map for different types of games (e.g., details of maps that may be used for assisting each user to determine the position of the virtual character controlled by this user in the game world, real-time positions of ally virtual characters controlled by teammates, real-time positions of enemy virtual characters, current game scene vision information, etc.). The mini-map may be displayed at the upper left, upper right, or other positions on the GUI. The present exemplary embodiment is not limited to the displayed position of the mini-map.

Figure 3:
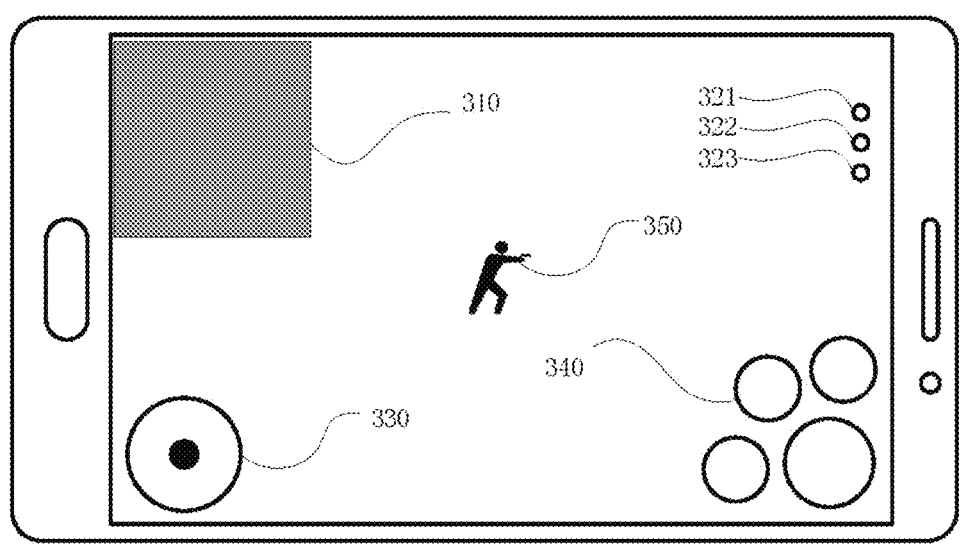
FIG. 3 is a schematic diagram of a graphical user interface of a mobile terminal according to an embodiment of the present disclosure.

In an optional embodiment, the GUI includes at least one signal icon (e.g., signal icons 321, 322, 323 in FIG. 3). The at least one signal icon may be located at the upper left, upper right, or other positions of the GUI. The at least one signal icon may also be located on the same or different sides of the GUI. The present exemplary embodiment is not limited to the position of the at least one signal icon on the GUI.

At step S110, a motion control is provided on the GUI, the motion control includes an area object and an operation object, and an initial position of the operation object is within a range of the area object.

Figure 4:
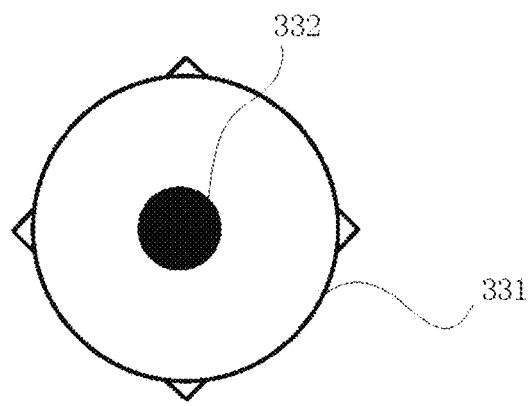
FIG. 4 is a schematic diagram of a motion control according to an embodiment of the present disclosure.

As shown in FIG. 3, a motion control 330 may be provided on the GUI. As shown in FIG. 4, the motion control 330 includes an area object 331 and an operation object 332 of which an initial position is within the range of the area object. Shapes of both the area object 331 and the operation object 332 are circular, and the initial position of the operation object 332 is at the center of the area object 331. The area object 331 may be generated at a predetermined position on the GUI, or may also be generated at a starting position of a touch operation.

In an optional embodiment, the shape of the area object 331 is circular as a whole, and the area object is provided with a direction indicator on a circumference thereof. A number of the direction indicator may be at least one. As shown in FIG. 4, the direction indicator is used for indicating a movement direction of a virtual character corresponding to a current position of the operation object 332. According to the embodiment shown in FIG. 4, the direction indicator includes up, down, left and right arrows, which respectively corresponds to up, down, left, and right directions. A user may be prompted by specially rendering the direction indicator corresponding to the moving direction of the current virtual character. In an exemplary embodiment, a single indicator may be adopted, and the indicator is controlled to move in a periphery of the area object according to the position of the operation object, so that the direction indicated by the single indicator is consistent with the moving direction of the virtual character.

According to an optional embodiment as shown in FIG. 4, the operation object 332 is a circle located at an initial position, and the initial position is at the center of the area object 331.

In an optional embodiment, at least one of the area object 331 and the operation object 332 is oval, triangle, rectangle, hexagon, other polygon, etc., or irregular image (e.g., horseshoe, tiger head, bear paws, etc.)

In an optional embodiment, the operation object 332 is located at a predetermined position in the area object 331, and is not limited to a center or a mass center position of the area object 331.

At step S130, a first sliding touch operation is detected on the operation object, and the operation object is moved within a predetermined range according to a movement of a touch point of the first sliding touch operation.

Figure 5:
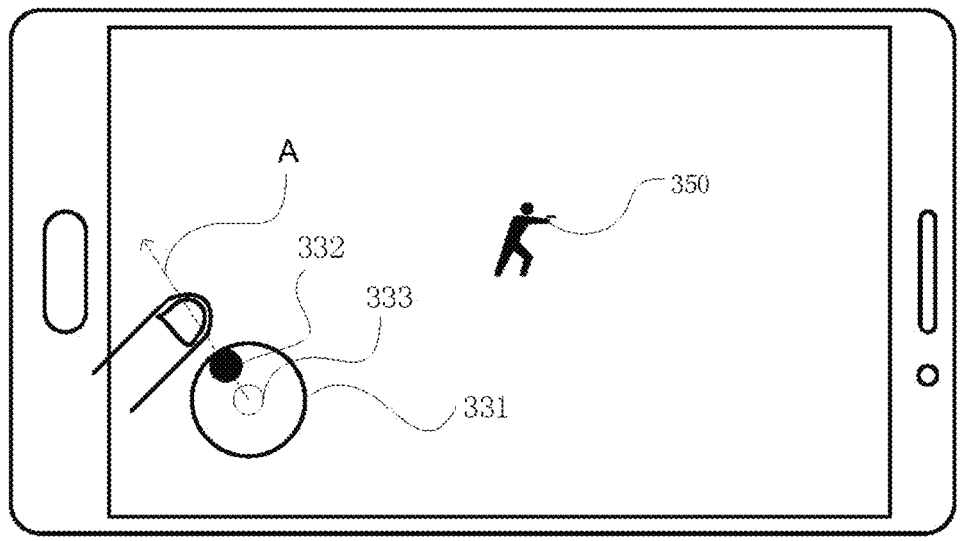
FIG. 5 is a schematic diagram of movement control according to a first exemplary embodiment of the present disclosure.

For example, as shown in FIG. 5, when a first sliding touch operation acting on the operation object 332, the operation object 332 is controlled to move within the range of the area object 331 according to the movement of the touch point of the first sliding touch operation. The touch point between the finger of a user acting on a touch screen moves from a starting position 333 of the operation object 332 to the outside of the area object 331. When the touch point is within the range of the area object 331, the operation object 332 is controlled to move along a movement of the touch point of the first sliding touch operation. When the touch point moves beyond the range of the area object 331, the operation object 332 may not move beyond the range of the area object 331, as shown in FIG. 5. A direction A is a direction from the starting position 333 of the operation object 332 to the current touch point, and the operation object 332 is located on the direction line A. When the touch point moves, the position of the operation object 332 may be changed. That is, the direction A may be changed. Moreover, the virtual character 350 is controlled to move in the game scene along the direction A.

In an optional embodiment, when a first sliding touch operation is acted on the operation object, the operation object is controlled to move within a predetermined range according to a movement of a touch point of the first sliding touch operation. The predetermined range refers to a circular range having a predetermined length as a radius and a predetermined position in the area object as a center.

Figure 6:
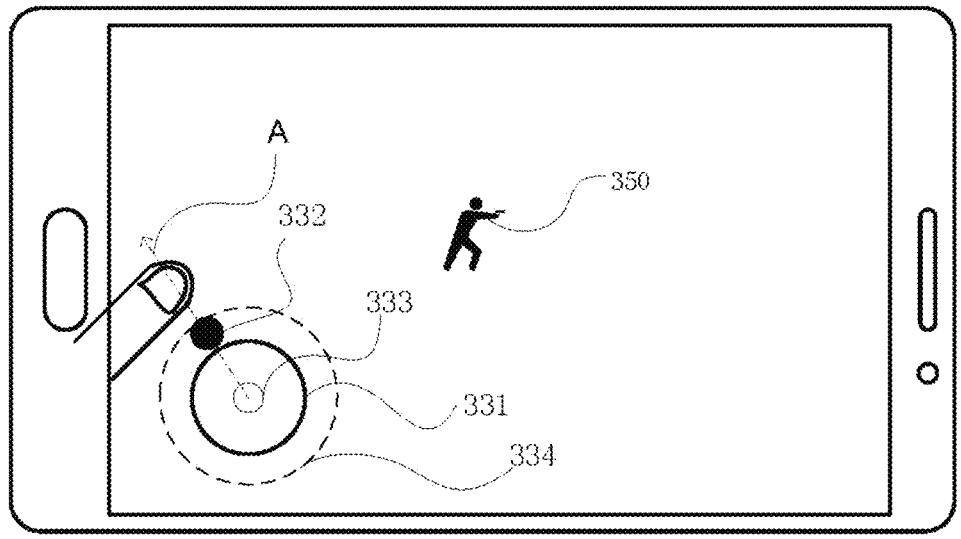
FIG. 6 is a schematic diagram of movement control according to a second exemplary embodiment of the present disclosure.

For example, as shown in FIG. 6, when a sliding touch operation is acted on the operation object 332, the operation object 332 is controlled to move within a predetermined range 334 along a movement track of a touch point of the sliding touch operation. The predetermined range 334 includes at least one of followings: the range of the area object; and, a circular range having a predetermined length as a radius and a predetermined position in the area object as a center.

The touch point of the finger of a user acting on the touch screen moves from a starting position 333 of the operation object 332 to the outside of the predetermined range 334. When the touch point is within the predetermined range 334, the operation object 332 is controlled to move along a movement track of the touch point of the sliding touch operation. When the touch point moves beyond the predetermined range 334, the operation object 332 may not move beyond the predetermined range 334. A direction A is a direction from the starting position 333 of the operation object 332 to a current touch point, and the operation object 332 is located on the direction line A. When the touch point moves, the position of the operation object 332 may be changed. That is, the direction A may be changed. Moreover, the virtual character 350 is controlled to move in the game scene along the direction A.

In an optional embodiment, when a distance between the touch point and a center of the area object 331, or a distance between the touch point and the initial position of the operation object 332 is greater than a predetermined distance, the area object 331 and the operation object 332 are controlled to move along with the touch point.

In an optional embodiment, a moving speed of the virtual character 350 is determined according to the distance between the touch point and the center of the area object 331, or, a moving speed of the virtual character 350 is determined according to the distance between the touch point and the initial position of the operation object 332 in the area object 331. For example, as the touch point is gradually far away from the center of the area object 331 or gradually far away from the initial position of the operation object 332, the moving speed of the virtual character 350 is increasing. When the distance between the touch point and the center of the area object 331, or the distance between the touch point and the initial position of the operation object 332 is smaller than a preset distance, the moving speed of the virtual character 350 is a first preset speed. When the distance between the touch point and the center of the area object 331, or the distance between the touch point and the initial position of the operation object 332 is greater than or equal to the preset distance, the moving speed of the virtual character 350 is a second preset speed. In an embodiment, the second preset speed is greater than the first preset speed.

At step S150, a position of the touch point of the first sliding touch operation on the GUI is detected, and when under the condition of position of the touch point satisfying a preset condition, an indication locking object is provided on the GUI.

The position of the touch point of the first sliding touch operation on the GUI is detected, and a locking intention of the user may be determined by detecting whether the position of the touch point on the GUI satisfies a preset condition. The preset condition may be that the distance between the touch point and the center position of the area object is used as a determination condition, or whether the touch point enters a locking preparation area is used as a determination condition, or whether stay time period of the touch point in the preset area exceeds preset time period is used as the determination condition, or other conditions that can be used for determining the operation intention of the user. The present embodiment is not limited to the content of the preset condition.

In an optional embodiment, a indication locking object is provided on the GUI. A locking indication may be text indication information, graphic indication information, or a combination of the text indication information and the graphic indication information, which is not limited herein.

In this way, it is possible to provide a guiding indication for the interactive operation, which is convenient for intuitive operation.

Figure 7:
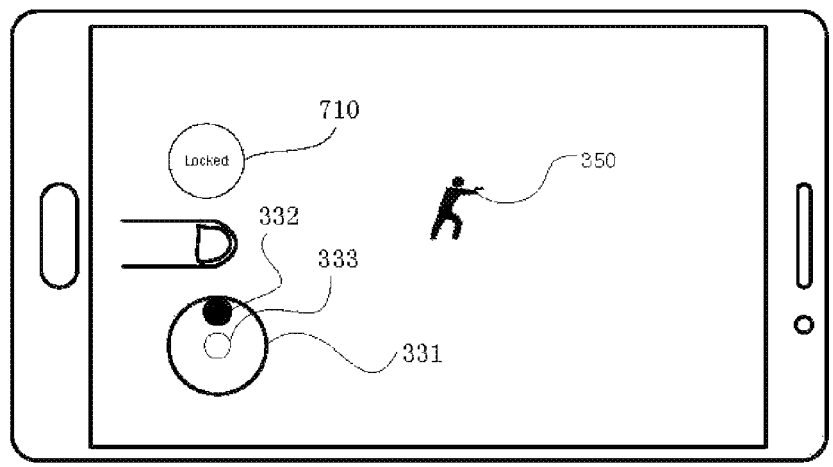
FIG. 7 is a schematic diagram of an interaction operation indication according to a first exemplary embodiment of the present disclosure.

The position of the indication locking object on the GUI may be determined by the positions of the touch point and the motion control. For example, the indication locking object is located on an extension line of the connection between the touch point and the initial position of the operation object, as shown in FIG. 7. The indication locking object may also be located at a fixed position on the GUI. For example, the indication locking object is located at the upper side of the motion control, as shown in FIG. 7.

For example, the position of the touch point of the first sliding touch operation on the GUI is detected. As shown in FIG. 7, when the position of the touch point satisfies the preset condition (for example, the distance between the finger touching a screen and an initial position 333 of the operation object), an indication locking object 710 is provided on the GUI. The indication locking object 710 includes text indication information "locked" for instructing the player to further move the touch point to a position at which the indication locking object 710 is located so as to lock the operation object.

In this way, the operation is more intuitive and convenient, and the operation feedback is clearly given, which can improve the success rate and accuracy of the locking operation.

In an optional embodiment, the step S150 includes that: when the distance between the touch point on the GUI and the initial position of the operation object in the area object is greater than a preset distance, the indication locking object is provided on the GUI.

For example, whether a indication locking object is provided on the GUI may be determined is based on whether the distance between the touch point and a preset position in the area object is greater than a preset distance. Or, whether an indication locking object is provided on the GUI may be determined according to whether the distance between the touch point and the initial position of the operation object in the area object is greater than a preset distance. In this way, a distance threshold may be set to prevent the player from mis-operation, and comparing to controlling the pressing force, controlling the moving distance of the touch point is more convenient for the user and the operation success rate is greatly improved.

In an optional embodiment, the GUI includes a locking preparation area, and the step S150 includes that: when the touch point moves into the locking preparation area, an indication locking object is provided on the GUI. The shape of the locking preparation area may be any shape, may be a visually visible area, or may be a visually invisible area. The shape of the locking preparation area may be any shape, may be a visually visible area, or may be a visually invisible area. The position of the locking preparation area on the GUI may be determined by the position of the touch point and the position of the motion control. For example, the locking preparation area is located on an extension line of the connection between the touch point and the initial position of the operation object. The locking preparation area may also be located at a fixed position on the GUI. For example, the locking preparation area is located at the upper side of the motion control.

Figure 8:
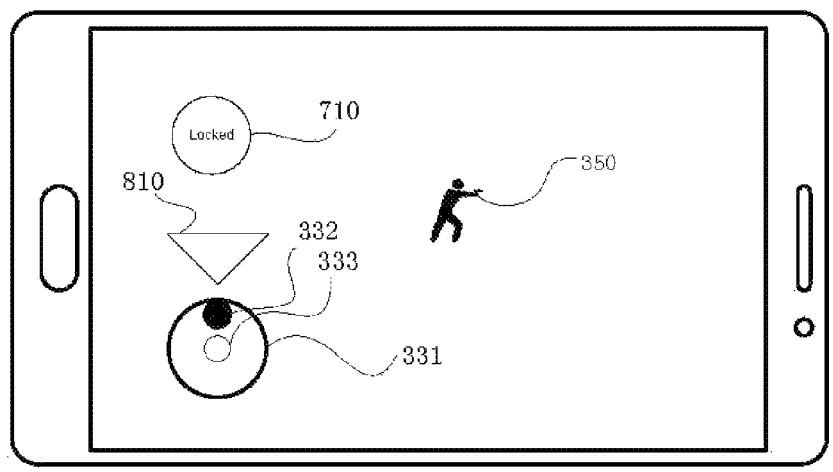
FIG. 8 is a schematic diagram of an interaction operation indication according to a second exemplary embodiment of the present disclosure.

For another example, a locking preparation area 810 may be disposed at a predetermined distance above the area object 331. The locking preparation area may be a triangle as shown in FIG. 8 or a fan shape or other shape. An annular area may be provided as the locking preparation area in the periphery of the area object 331 on the GUI. When the touch point moves into the locking preparation area, a indication locking object is provided on the GUI. In this way, the distance between the locking preparation area 810 and the area object 331 or the appropriate inner circular radius of the locking preparation area (for example, the annular area) may be set to prevent the player from mis-operation. Controlling the moving distance of the touch point is more convenient for the player than controlling the pressing force, and the operation success rate is greatly improved. The inner and outer contours of the locking preparation area may also be other shapes, such as an elliptical shape, or other irregular shapes.

In an optional embodiment, the step S150 includes that: when the staying duration of the touch point in a preset area on the GUI exceeds a preset duration, a indication locking object is provided on the GUI.

A shape of the preset area may be any shape, may be a visually visible area, or may be a visually invisible area. The position of the preset area on the GUI may be determined by the position of the touch point and the position of the motion control. For example, the preset area is located on an extension line of the connection between the touch point and the initial position of the operation object. The preset area may also be located at a fixed position on the GUI. For example, the preset area is located at the upper side of the motion control.

For another example, the preset area may be disposed at a predetermined distance above the area object 331 on the GUI. The shape of the preset area may be a triangle (810 in FIG. 8) as shown in FIG. 8 or a fan shape or other shape. An annular area may be provided as the preset area in the periphery of the area object 331. When the staying duration of the touch point in the preset area on the GUI exceeds the preset duration, the indication locking object is provided on the GUI.

It should be noted that in FIG. 7, the operation object 332 is located within the range of the area object 331, and the operation object 332 is not at the same position as the touch point (the touch position of the finger of the player on the GUI). However, as mentioned and shown in the foregoing and FIG. 5 and FIG. 6, the positional relationship between the operation object 332 and the touch point is not limited to that shown in FIG. 7, and the operation object 332 and the touch point may also be located at the same position on the GUI (the operation object follows the touch point). Or, the operation object 332 is outside the area object 331, and the operation object 332 and the touch point are located at different positions on the GUI, as shown in FIG. 6.

At step S170, the touch point is determined to move into a range of the indication locking object, and the operation object is controlled to enter a position-locked state.

Figure 9:
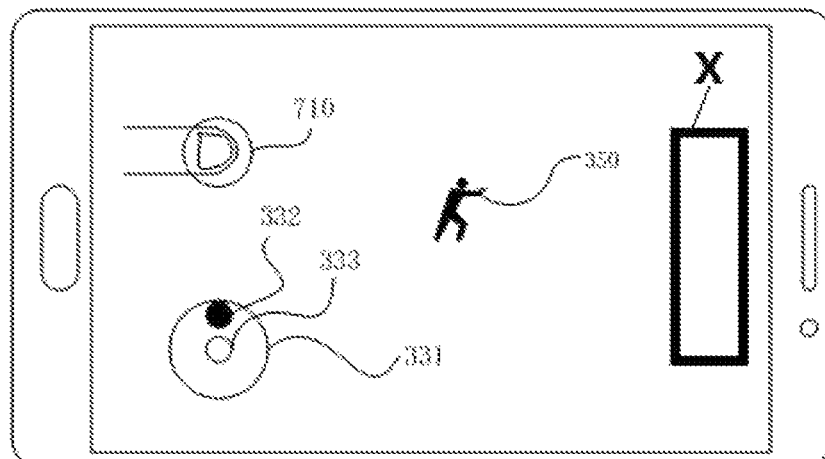
FIG. 9 is a schematic diagram of an interaction operation indication according to a third exemplary embodiment of the present disclosure.

For example, after the indication locking object 710 is provided on the GUI, as shown in FIG. 7, the position of the touch point is continuously detected, and when the touch point is determined to move into the range of the indication locking object, as shown in FIG. 9, the operation object is controlled to enter the position-locked state.

The position of the operation object is kept unchanged under the position-locked state.

For example, after the operation object entering into the position-locked state, as shown in FIG. 9, and in response to determining an terminal operation of the first sliding touch operation (for example, the finger of the player or other touch objects leave the screen of the mobile terminal), the position of the operation object on the GUI may also be kept unchanged. That is, the position of the operation object is kept, when the operation object enters the locked state. Under the locked state, the operation object may be within the range of the area object, or beyond the range of the area object, or within the range of the indication locking object.

At step S190, the virtual character is controlled, under the position-locked state, to continuously move in the game scene at least according to a locking position of the operation object. The step includes that: the virtual character is controlled to move in the game scene according to a locking position of the operation object, or, a locking direction is determined on the GUI according to the locking position of the operation object, and the virtual character is controlled to move in the game scene according to the locking direction on the GUI.

It should be noted that controlling the virtual character to move in the game scene according to the locking position of the operation object refers to determining the locking position of the operation object as a variable for controlling the movement of the virtual character in the game scene. The variable may be one of multiple variables for controlling the virtual character to move in the game scene, or may be the unique variable.

The virtual character is controlled to move in the game scene according to the locking position of the operation object. For example, under the position-locked state as shown in FIG. 9, the operation object 332 is located above the area object 331, and the virtual character 350 may be controlled to move in the game scene according to the locking position of the operation object, such that the virtual character 350 also moves above the GUI. Similarly, under the position-locked state, when the operation object 332 is located at the right side of the area object, the virtual character 350 may be controlled to move in the game scene according to the locking position of the operation object, so that the virtual character 350 also moves in the right direction on the GUI.

In an optional embodiment, the virtual character is controlled to continuously move in the game scene according to a locking position of the operation object and a current orientation of the virtual character in the game scene. The locking direction is determined according to the locking position of the operation object 332. According to the locking direction, the virtual character 350 is controlled to continuously move in the corresponding direction. For example, corresponding relationship between the locking direction and the moving direction of the virtual character is set advance, and the moving direction of virtual is same as the current orientation of the virtual character (in one of the corresponding relationships, the upside of the locking direction corresponds to the front of the current orientation of the virtual character, the left side of the locking direction corresponds to the left side of the current orientation of the virtual character, the right side of the locking direction corresponds to the right side of the current orientation of the virtual character, etc.). Then, according to the locking direction determined by the locking position of the operation object 332 and the preset corresponding relationship, the virtual character is controlled to move in a corresponding direction. Under the position-locked state as shown in FIG. 9, the operation object 332 is located right above the area object 331, and the virtual character 350 may be controlled to move toward the front of the orientation of the virtual character in the game scene according to the locking position of the operation object. Similarly, under the position-locked state, when the operation object 332 is located in the left direction of the area object, the virtual character 350 may be controlled to move toward the left side of the orientation of the virtual character in the game scene according to the locking position of the operation object.

In an optional embodiment, the step 190 includes that: the virtual character is controlled to continuously move in the game scene according to the locking position of the operation object and a preset position in the area object.

In an optional embodiment, the GUI includes an orientation control area, and the method further includes that: a second sliding touch operation acting on the orientation control area is detected under the position-locked state; and the orientation of the virtual character in the game scene is adjusted according to a movement of a touch point of the second sliding touch operation, and the virtual character is controlled to move in the game scene according to the locking position of the operation object and the orientation of the virtual character.

The contour shape of the orientation control area may be any shape, e.g., a predetermined shape of a game system such as a rectangle, a circular rectangle, a circle, an ellipse, or a user-defined shape. The size of the orientation control area may be any size. The orientation control area may be located at any position on the GUI. For example, the contour shape of the orientation control area is a rectangle, and the orientation control area and the motion control are respectively located at both sides of the GUI. As shown in FIG. 9, the orientation control area X may be located at the right side of the GUI. The orientation control area may be an area with a visual indicator, such as an area having at least a partial bounding box, or a color-filled area, or an area having a predetermined transparency, or other areas capable of visually indicating the range of the orientation control area. As another optional embodiment, the orientation control area may also be a touch control area not having a visual indication. In an optional embodiment, an operation control may be included in the orientation control area, and the operation control may be controlled to move within a preset range according to a sliding operation.

Under the position-locked state, the second sliding touch operation acting on the orientation control area is detected, and the orientation of the virtual character in the game scene is adjusted according to the movement of the touch point of the second sliding touch operation. That is, when the operation object is under the position-locked state, the orientation of the virtual character in the game scene may still be adjusted by the second sliding touch operation received by the orientation control area. For example, under the position-locked state, at time point T1, the virtual character is in a first orientation direction (e.g., north direction) in the game scene. After adjusting the orientation of the virtual character by the second sliding touch operation, under the position-locked state, at time point T2, the orientation of the virtual character is changed to a second direction from the first orientation direction (e.g., west direction) in the game scene. Since the operation object is under the position-locked state (for example, the position shown in FIG. 9), the user does not need to operate the motion control, the virtual character may automatically move in the first direction in the game scene, and after adjusting the orientation of the virtual character by the second sliding touch operation, the virtual character may still automatically move toward the current orientation (moving in the second direction) in the game scene. In this way, not only the left hand of the user is liberated, but also the flexibility of the movement operation is increased. The user can adjust the moving direction of the virtual character in the game scene by the simple operation of the right hand under the position-locked state of the operation object, and the automatic moving state of the virtual character in the game scene will not be interrupted, which greatly improves the operation efficiency.

In an optional embodiment, the GUI includes a cancellation locking area, and the method further includes that:

a third sliding touch operation acting on the cancellation locking area is detected under the position-locked state, and when detecting the third sliding touch operation, the operation object is controlled to quit the position-locked state.

For example, under the position-locked state, the user may perform other operations in the game with the left hand, and when the user wants to quit the position-locked state, the user may click the cancellation locking area on the GUI. When detect a touch operation acting on the cancellation locking area, the operation object is controlled to quit the position-locked state.

In an optional embodiment, the locking cancellation area at least partially covers the indication locking object.

In an optional embodiment, the method further includes that: when determine a preset cancellation locking operation, the operation object is controlled to quit the position-locked state. For example, when the operation object is under the position-locked state and determine a skill release triggering operation (for example, a shooting operation triggering operation), the operation object is controlled to quit the position-locked state. Or, when detect a touch operation acting on the motion control, the operation object is controlled to quit the position-locked state.

Figure 10:
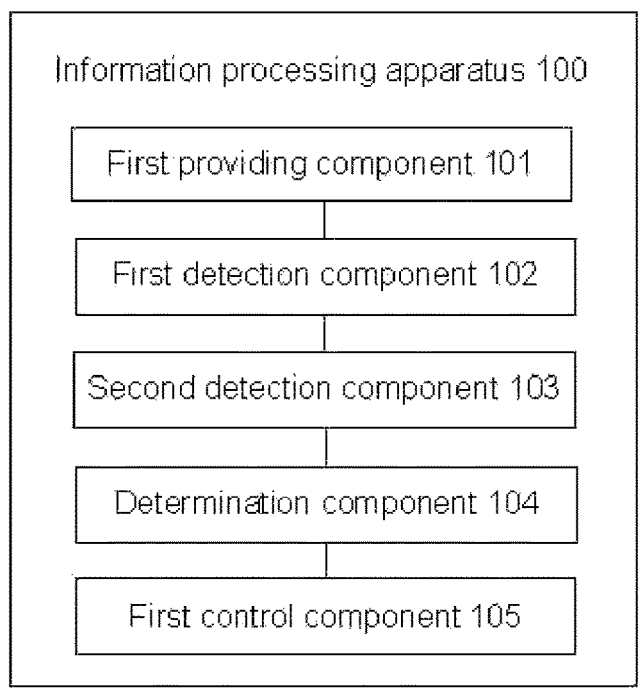
FIG. 10 is a schematic diagram of an information processing apparatus according to an embodiment of the present disclosure.

In another embodiment of the present disclosure, an information processing apparatus is provided by executing a software application on a processor of a mobile terminal and rendering a GUI on a touch screen of the mobile terminal, and contents displayed by the GUI at least including a partially game scene and a partially virtual character. FIG. 10 is a schematic diagram of an information processing apparatus according to an embodiment of the present disclosure. As shown in FIG. 10, an information processing apparatus 100 comprises:

a first providing component 101, configured to provide a motion control on the GUI, the motion control including an area object and an operation object of which an initial position is within a range of the area object;

a first detection component 102, configured to detect a first sliding touch operation acting on the operation object, and move the operation object within a predetermined range according to a movement of a touch point of the first sliding touch operation;

a second detection component 103, configured to detect a position of the touch point of the first sliding touch operation on the GUI, and provide, under the condition of the position of the touch point on the GUI satisfying a preset condition, an indication locking object on the GUI;

a determination component 104, configured to determine the touch point moves into a range of the indication locking object, and control the operation object to enter a position-locked state; and a first control component 105, configured to control, under the position-locked state, the virtual character to continuously move in the game scene at least according to a locking position of the operation object.

Figure 11:
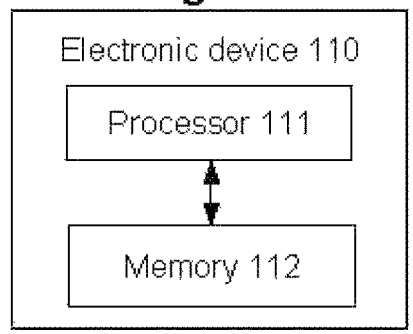
FIG. 11 is a schematic diagram of an electronic device according to an embodiment of the present disclosure.

In another one embodiment of the present disclosure, an electronic device is also provided. FIG. 11 is a schematic diagram of an electronic device according to an embodiment of the present disclosure. As shown in FIG. 11, an electronic device 110 comprises: processor 111 and memory 112. In some possible implementation manners, the electronic device 110 includes: at least one processor 111, and at least one memory 112 configured to store at least one executable indication of the at least one processor 111, such as at least one application program. The at least one processor 111 is configured to execute at least one executable indication to perform the following steps:

providing a motion control on the GUI, the motion control comprising an area object and an operation object, and an initial position of the operation object is within a range of the area object;

detecting a first sliding touch operation on the operation object, and moving the operation object within a predetermined range according to a movement of a touch point of the first sliding touch operation;

detecting the position of the touch point on the GUI, and under the condition of the position of the touch point satisfying a preset condition, providing an indication locking object on the GUI;

determining the touch point moves into a range of the indication locking object, and controlling the operation object to enter a position-locked state; and controlling, under the position-locked state, the virtual character to continuously move in the game scene at least according to a locking position of the operation object.

Figure 12:
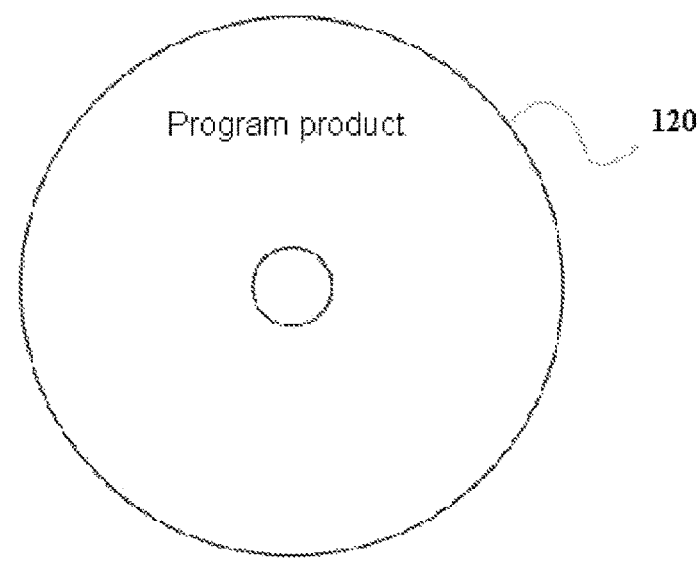
FIG. 12 is a schematic diagram of a computer-readable storage medium according to an embodiment of the present disclosure.

In another embodiment of the present disclosure, a computer-readable storage medium is also provided. FIG. 12 is a schematic diagram of a computer-readable storage medium according to an embodiment of the present disclosure. As shown in FIG. 12, a program product capable of implementing the above method of the present specification is stored on a computer-readable storage medium 120. In some possible implementation manners, various aspects of the present disclosure may also be implemented in the form of a program product, which includes at least one program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include at least one program code, and may run on a terminal device such as a personal computer. However, the program product of the present disclosure is not limited thereto, and in this document, the readable storage medium may be any tangible medium that contains or stores a program. The program may be used by or in conjunction with an indication execution system, device, or apparatus.

The program product may employ any combination of one or more readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

The sequence numbers of the foregoing embodiments of the present disclosure are for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in an element. The integrated element may be implemented in a hardware form or may be implemented in a software function element form.

When the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of indications enabling a computer device (which may be a personal computer, a server or a network device) to execute all or some of the steps of the method according to each embodiment of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged in appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

Obviously, the described embodiments are a part of the present disclosure and not all of the embodiments. All other embodiments obtained by persons of ordinary skill in the art based on the embodiments of the present disclosure without creative efforts shall fall within the protection scope of the present disclosure.

What is claimed is:

1. An information processing method, provided by executing a software application on a processor of a mobile terminal and rendering a graphical user interface (GUI) on a touch screen of the mobile terminal, and contents displayed by the GUI at least comprising a partial game scene and a partial virtual character, the method comprising:
    providing a motion control on the GUI, the motion control comprising an area object and an operation object, and an initial position of the operation object is within a range of the area object, wherein the motion control is used for controlling the virtual character to move in the game scene;
    detecting a first sliding touch operation on the operation object, and moving the operation object within a predetermined range determined by the area object according to a movement of a touch point of the first sliding touch operation;
    detecting the position of the touch point on the GUI, and under the condition of the position of the touch point satisfying a preset condition, providing an indication locking object on the GUI, wherein the indication locking object is used for indicating to move the touch point of the first sliding touch operation to a position at which the indication locking object is located;
    determining the touch point of the first sliding touch operation moves into the range of the indication locking object on the GUI, and controlling the operation object to enter a position-locked state; and
    controlling, under the position-locked state, the virtual character to continuously move in the game scene.

2. The method as claimed in claim 1, wherein controlling the virtual character to continuously move in the game scene comprises:
    controlling the virtual character to continuously move in the game scene according to a current orientation of the virtual character in the game scene.

3. The method as claimed in claim 1, wherein the GUI comprises an orientation control area, and controlling the virtual character to continuously move in the game scene comprises:
    detecting a second sliding touch operation acting on the orientation control area under the position-locked state; and
    adjusting an orientation of the virtual character in the game scene according to a movement of a touch point of the second sliding touch operation, and controlling the virtual character to continuously move in the game scene according to a current orientation of the virtual character in the game scene.

4. The method as claimed in claim 1, wherein the position of the operation object on the GUI is kept unchanged under the position-locked state, in response to determining an terminal operation of the first sliding touch operation.

5. The method as claimed in claim 1, wherein controlling the virtual character to continuously move in the game scene comprises:
    determining a locking direction on the GUI, and controlling the virtual character to move in the game scene according to the locking direction.

6. The method as claimed in claim 1, wherein controlling the virtual character to continuously move in the game scene comprises:
    controlling the virtual character to move in the game scene according to a preset position in the area object, wherein the area object is provided with at least one of the following direction indicator: at least one direction indicator provided at a fixed position and used for indicating a movement direction of the virtual character corresponding to a current position of the operation object; and a single direction indicator controlled to move in a periphery of the area object according to the position of the operation object, and a direction indicated by the indicator is consistent with a moving direction of the virtual character.

7. The method as claimed in claim 1, wherein providing, under the condition of the position of the touch point satisfying the preset condition, the indication locking object on the GUI comprises at least one of the following manners:

when a distance between the touch point and an initial position of the operation object in the area object is greater than a preset distance, providing the indication locking object on the GUI;

when a staying duration of the touch point in a preset area of the GUI exceeds a preset duration, providing the indication locking object on the GUI; and whether a distance between the touch point of the first sliding touch operation and a preset position in the area object is greater than a preset distance.

8. The method as claimed in claim 1, wherein the GUI comprises a locking preparation area, and providing, under the condition of the position of the touch point in the GUI satisfying the preset condition, an indication locking object on the GUI comprises:

when the touch point moves into the locking preparation area on the GUI, providing the indication locking object on the GUI.

9. The method as claimed in claim 1, wherein the GUI comprises a cancellation locking area, the method further comprising:

detecting a third sliding touch operation acting on the cancellation locking area under the position-locked state, and when detecting the third sliding touch operation, controlling the operation object to quit the position-locked state.

10. The method as claimed in claim 9, wherein the cancellation locking area at least partially covers the indication locking object.

11. The method as claimed in claim 1, further comprising: when detecting a preset cancellation locking operation, controlling the operation object to quit the position-locked state.

12. The method as claimed in claim 1, wherein the predetermined range comprises at least one of the following: the range of the area object, and a circular range having a predetermined length as a radius and centered on a predetermined position in the area object.

13. An electronic device, comprising:
at least one processor; and
at least one memory, configured to store at least one executable indication of the at least one processor, wherein the at least one processor is configured to execute the information processing method as claimed in claim 1 by executing the at least one executable indication.

14. A computer-readable storage medium, on which at least one computer program is stored, wherein the at least one computer program is executed by at least one processor to implement the information processing method as claimed in claim 1.

15. The method as claimed in claim 1, further comprising at least one of the following steps: when the distance between the touch point and a center point of the area object is greater than a predetermined distance, controlling the area object and the operation object to move along with the touch point; and when the distance between the touch point and the initial position of the operation object is greater than a predetermined distance, controlling the area object and the operation object to move along with the touch point.

16. The method as claimed in claim 1, further comprising at least one of the following steps: determining a moving speed of the virtual character according to the distance between the touch point and the center point of the area object; and determining a moving speed of the virtual character according to the distance between the touch point and the initial position of the operation object in the area object.

17. The method as claimed in claim 1, wherein a locking indication of the indication locking object comprises at least one of the following: a text indication, and a graphic indication.

18. The method as claimed in claim 1, wherein the position of the indication locking object is determined in at least one of the following manners:

the position is determined according to the position of the touch point and the position of the motion control; and
the indication locking object is located at a fixed position in the GUI.

19. The method as claimed in claim 1, wherein determining the touch point of the first sliding touch operation moves into the range of the indication locking object on the GUI comprises:

after the indication locking object is provided on the GUI, continuously detecting the position of the touch point, and determining the touch point of the first sliding touch operation moves into the range of the indication locking object on the GUI.

20. The method as claimed in claim 1, wherein controlling, under the position-locked state, the virtual character to continuously move in the game scene comprises:

controlling, under the position-locked state, the virtual character to continuously move in the game scene without operating on the motion control.

21. The method as claimed in claim 1, wherein controlling, under the position-locked state, the virtual character to continuously move in the game scene comprises: controlling, under the position-locked state, the virtual character to continuously move in the game scene at least according to a locking position of the operation object.

22. An information processing apparatus, provided by executing a software application on a processor of a mobile terminal and rendering a graphical user interface (GUI) on a touch screen of the mobile terminal, and contents displayed by the GUI at least comprising a partial game scene and a partial virtual character, the apparatus comprising:

a first providing component, configured to provide a motion control on the GUI, the motion control comprising an area object and an operation object of which an initial position is within a range of the area object, wherein the motion control is used for controlling the virtual character to move in the game scene;

a first detection component, configured to detect a first sliding touch operation acting on the operation object, and move the operation object within a predetermined range determined by the area object according to a movement of a touch point of the first sliding touch operation;

a second detection component, configured to detect a position of the touch point of the first sliding touch operation on the GUI, and provide, under the condition of the position of the touch point in the GUI satisfying a preset condition, an indication locking object on the GUI, wherein the indication locking object is used for indicating to move the touch point of the first sliding touch operation to a position at which the indication locking object is located;

a determination component, configured to determine the touch point of the first sliding touch operation moves into the range of the indication locking object on the GUI, and control the operation object to enter a position-locked state; and a first control component, configured to control, under the position-locked state, the virtual character to continuously move in the game scene.

* * * * *